(12) United States Patent
Fontignie et al.

(10) Patent No.: US 9,256,648 B2
(45) Date of Patent: Feb. 9, 2016

(54) DATA HANDLING IN A CLOUD COMPUTING ENVIRONMENT

(71) Applicant: International Business Machines Corporation, Armonk, NY (US)

(72) Inventors: Jacques Fontignie, Vernier (CH); Claudio Marinelli, Rome (IT); Bernardo Pastorelli, Rome (IT); Pierre-Antoine Queloz, Vernier (CH)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 13/899,364

(22) Filed: May 21, 2013

(65) Prior Publication Data
US 2013/0318102 A1    Nov. 28, 2013

(30) Foreign Application Priority Data

May 22, 2012   (GB) .................................. 1208959.5

(51) Int. Cl.
*G06F 17/30* (2006.01)
*H04L 29/08* (2006.01)

(52) U.S. Cl.
CPC ........ *G06F 17/3053* (2013.01); *H04L 67/2842* (2013.01); *H04L 67/08* (2013.01)

(58) Field of Classification Search
USPC ................................................ 707/706, 748
See application file for complete search history.

(56) References Cited

U.S. PATENT DOCUMENTS

| 5,764,885 | A  | * | 6/1998  | Sites et al. ...................... 714/45 |
| 5,802,272 | A  | * | 9/1998  | Sites et al. ...................... 714/45 |
| 7,743,044 | B1 |   | 6/2010  | Kalogeraki et al. |
| 7,797,507 | B2 |   | 9/2010  | Tago |
| 7,805,518 | B1 |   | 9/2010  | Kamvar et al. |
| 7,979,416 | B1 | * | 7/2011  | Santry et al. .................. 707/706 |
| 8,046,550 | B2 | * | 10/2011 | Feathergill ..................... 711/162 |
| 2002/0095403 | A1 |   | 7/2002 | Chandrasekaran et al. |
| 2006/0106992 | A1 |   | 5/2006 | Palomar et al. |
| 2007/0022248 | A1 | * | 1/2007 | Ghildiyal ....................... 711/122 |
| 2007/0208690 | A1 | * | 9/2007 | Schneider et al. ................ 707/2 |
| 2008/0271017 | A1 |   | 10/2008 | Herington |
| 2008/0306917 | A1 | * | 12/2008 | Ishii et al. ......................... 707/3 |

(Continued)

FOREIGN PATENT DOCUMENTS

| EP | 1162538 A2  | 12/2001 |
| JP | 63311555 A  | 12/1988 |

OTHER PUBLICATIONS

UK Search Report, Application No. GB1208959.5, Aug. 23, 2012, 3 pages.

Drost, Niels et al., "Zorilla: a peer-to-peer middleware for real-world distributed systems", Concurrency and Computation: Practive and Experience, http://www.cs.vu.nl/~rob/papers/ccpe-zorilla-final-2011.pdf, 2011, 16 pages.

(Continued)

*Primary Examiner* — Kim Nguyen
(74) *Attorney, Agent, or Firm* — Francis Lammes; Stephen J. Walder, Jr.; Joseph Petrokaitis

(57) ABSTRACT

The present invention relates to a method for data handling in a computing environment. A data access request is generated to access data by a requesting VM. VMs of an ordered list are sequentially checked for data cache hit corresponding to the data in an order given by a ranking. The data is read from the checked VM in response to at least one data cache hit of a checked VM being found, and thereafter a ranking value of the checked VM is updated, thereby updating ranking based on the ranking value. The data is requested from the at least one storage server in response to no data cache hot being found.

20 Claims, 5 Drawing Sheets

(56) References Cited

U.S. PATENT DOCUMENTS

| | | |
|---|---|---|
| 2009/0259657 A1 | 10/2009 | Baltus et al. |
| 2010/0107163 A1 | 4/2010 | Lee |
| 2010/0287280 A1 | 11/2010 | Sivan |
| 2011/0126197 A1 | 5/2011 | Larsen |
| 2011/0296411 A1* | 12/2011 | Tang et al. .................. 718/1 |
| 2012/0096134 A1* | 4/2012 | Suit .............................. 709/221 |

OTHER PUBLICATIONS

Gupta, Diwaker et al., "Difference Engine: Harnessing Memory Redundancy in Virtual Machines", 8th USENIX Symposium on Operating Systems Design and Implementation (OSDI'08), http://cs.ucla.edu/~kohler/class/aosref/gupta08difference.pdf, 2008, pp. 309-322.

* cited by examiner

DATA HANDLING IN A CLOUD COMPUTING ENVIRONMENT

BACKGROUND

The invention relates to virtual environment systems and more particularly to a method for data handling in a cloud computing environment.

Computer virtualization becomes one of the more important technologies for different sized companies. Computer virtualization increases the computational efficiency and flexibility of a computing hardware platform.

Shared storage is a critical requirement for a virtualized environment. Customers can deploy shared storage using block based storage, such as the iSCSI SAN technology. By leveraging the iSCSI storage protocol, multiple virtual machines (VMs) may access the shared storage. However, if a VM must access multiple times common data on the shared storage, these data will be transferred multiple times through the network from the shared storage. That is, the iSCSI server serves multiple times the same block of shared data to the same VM. The load on this server can be very high.

US Patent 2008/0271017 discloses a method for identifying read-only portions of a file system, sharing the read-only portions among a plurality of virtual machines, and managing the shared read-only portions as a single unit.

SUMMARY

In one illustrative embodiment, a method for data handling in a computing environment is provided. In the illustrative embodiment, the computing environment comprises a plurality of virtual machines (VMs) and at least one storage server operably coupled through a network to the plurality of VMs. In the illustrative embodiment, each VM of the plurality of VMs has a data cache for storing data that has been read from the at least one storage server or other data caches. In the illustrative embodiment, the data cache comprises a data cache hit information providing indication that the data is located in the data cache. In the illustrative embodiment, each VM of the plurality of VMs has a ranking component to hold ranking of an ordered list of subset of VMs, each VM of the subset of VMs has an assigned ranking value. The illustrative embodiment generates a data access request to access data. The illustrative embodiment sequentially checks VMs of the ordered list of the requesting VM for a data cache hit corresponding to the data in the order given by the ranking. Responsive to at least one data cache hit of a checked VM being found, the illustrative embodiment reads the data from the checked VM and thereafter updates the ranking value of the checked VM, thereby updating ranking based on the ranking value. Responsive to no data cache hit being found, the illustrative embodiment requests the data from the at least one storage server.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

In the following, preferred embodiments of the invention will be described in greater detail by way of example only making reference to the drawings in which.

DETAILED DESCRIPTION

In the following, like numbered elements in the figures either designate similar elements or designate elements that perform an equivalent function. Elements which have been discussed previously will not necessarily be discussed in later figures if the function is equivalent.

Figure 1:
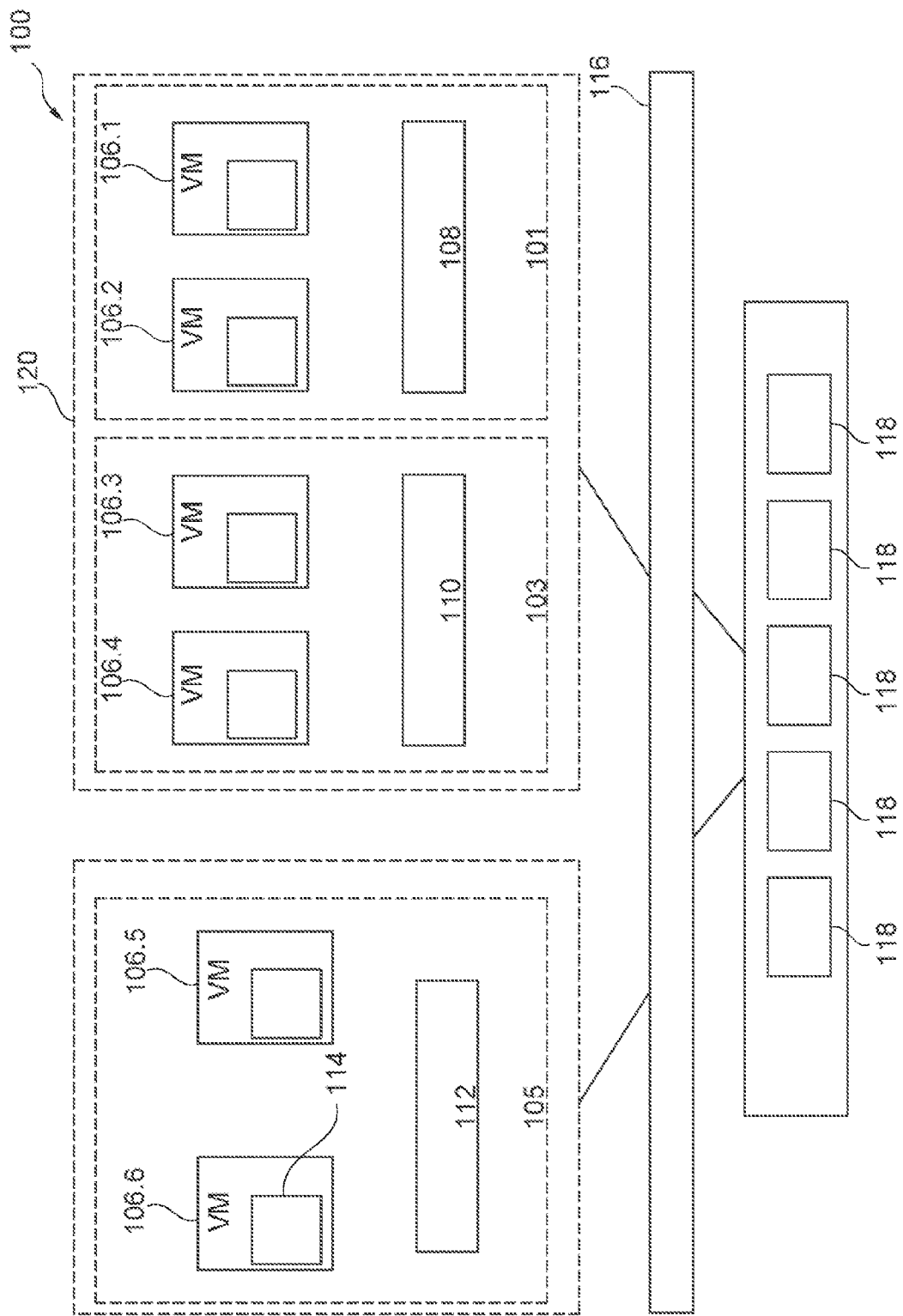
FIG. 1 illustrates system architecture for the execution of a method for data handling in a cloud computing environment.

FIG. 1 depicts proposed system architecture 100 operable to execute a process for data handling in a computing environment such as a cloud computing environment. The system 100 provides physical machines 101, 103 and 105 which are communicatively coupled via a network to a shared iSCSI storage server 118 providing remote hard disks. The network 116 may transmit data using an iSCSI protocol. The iSCSI protocol may allow initiators to send SCSI commands to the iSCSI storage server 118 utilizing a transmission control protocol/internet. Thus, the iSCSI storage server 118 is a SCSI-compatible RAID composed of hard-disk devices, so as to enable access to the VMs and exchange data using the iSCSI protocol.

Each of physical machines 101, 103 and 105 may comprise one or more virtual machines 106, for example, virtual machines 106.1 and 106.2 on physical machine 101, virtual machines 106.3 and 106.4 on physical machine 103, and virtual machines 106.5 and 106.6 on physical machine 105. Furthermore, each of physical machines 101, 103 and 105 may include a hypervisor 108, 110 and 112, respectively.

The hypervisor 108, 110 and 112 may include an iSCSI client, for example, implemented in software that may serve as an initiator of iSCSI commands. Alternatively, the iSCSI initiator may be part of the virtual machine 106.

Each of the virtual machines 106 uses a virtual disk 114 to store its operating system and program files. One or more applications run on the operating system. The virtual disk 114 may be a physical file, or a set of files, that can be copied, moved, archived, and backed up as easily as any other file. Each of the virtual machines 106 also includes a cache in the virtual disk 114. The cache contains data recently accessed from the iSCSI storage server 118 or from other virtual machine cache by the application. The whole virtual disk 114 of a VM may also be used as a cache in case the remote iSCSI storage server comprises the OS and application for that VM. That is, the VM may also cache locally the OS and the applications. The cache for a virtual machine, for example 106.1, is accessible by the other virtual machines (e.g. 106.2 106.3, 106.4, 106.5 and 106.6).

The iSCSI storage server 118 may be any type of storage device to which the physical machines 101, 103 and 105 and the virtual machines 106 may be coupled. For example, the iSCSI storage server 118 may comprise one or more small computer system interface (SCSI).

The physical machines 101, 103 and 105 may be grouped into the same subnet 120, in which each virtual machine (e.g. 106.1) maintains the addresses of other virtual machines (e.g. 106.2, 106.3, 106.4, 106.5 and 106.6), so that it can send messages to such other machines without restrictions imposed by a router for example. The operation of the system 100 will be described in more detail with reference to FIG. 2.

Figure 2:
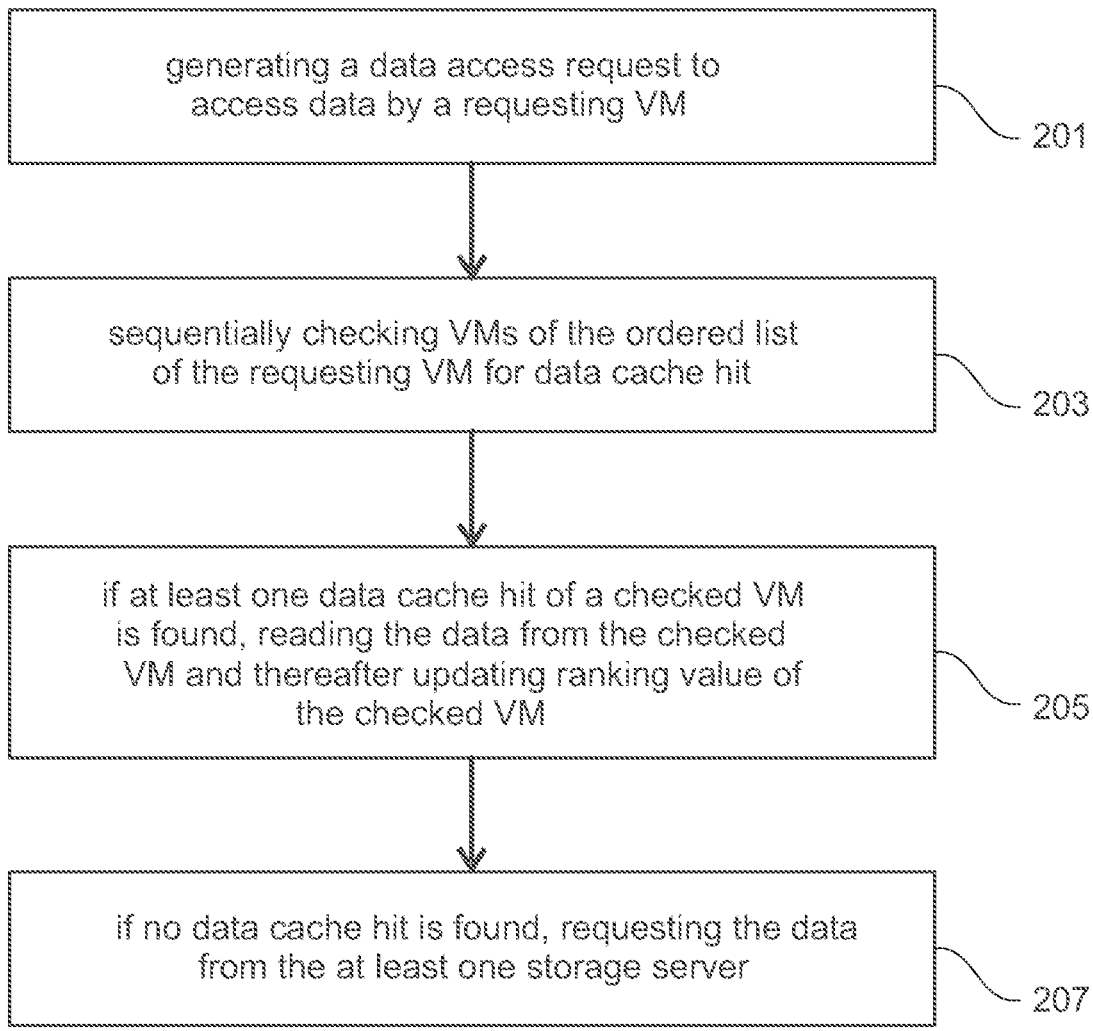
FIG. 2 is a flowchart of a method for data handling in a cloud computing environment.

FIG. 2 is a flowchart of a method for data handling in a computing environment such as a cloud computing environment. The cloud computing environment comprises a plurality of virtual machines VMs 106 and at least one storage server 118 such as an iSCSI storage server. The storage server 118 is operably coupled through a network 116 to the plurality of VMs 106, each VM of the plurality of VMs 106 having a data cache for storing data that has been read from the at least one storage server or other data caches. The data cache comprises a data cache hit information providing indication that the data is located in the data cache. Each VM of the plurality of VMs 106 has a ranking component to hold ranking of an ordered list of subset of VMs. Each VM of the subset of VMs has an assigned ranking value. In step 201, a requesting virtual machine 106.1 generates a data access request to access a data block. This may be triggered by an application running on the operating system of the requesting VM and requiring the data block. The data block is stored on the at least one server storage and/or on other data caches. The request may be, for example, an iSCSI command sent by an iSCSI initiator of the requesting virtual machine. The initiator transports SCSI requests and responses, encapsulated into the iSCSI protocol. In step 203, the requesting VM sequentially checks VMs of its ordered list for data cache hit corresponding to the data block in the order given by the ranking. This is done, for example, by sending the data access request to VMs of the ordered list and receiving the data if the data cache hit is found. The data access request includes an address. The data cache hit provides information as to location of data for the address in the data cache. If at least one data cache hit of a checked VM is found, the requesting VM reads, in step 205, the data block from the checked VM. After this, the requesting VM updates the ranking value. The ranking value of a checked VM is increased if the data cache hit of the data block is found in the checked VM; otherwise the ranking value is decreased. The requesting VM updates then the ranking based on the ranking value. If no data cache hit is found, in 207, the requesting virtual machine request the data block from the at least one storage server.

Multiple VMs of the computing environment may have a set of common data stored on the storage server. If one or more VMs require an access or multiple accesses to the common data, these data will be transferred multiple times through the network from the storage server. Multiple accesses may be required by VMs having not enough disk space to locally cache the common data at a first access. This causes a very high load on the storage server. Thus, the purpose of the invention is to minimize the load on the storage server, by using a peer to peer approach for sharing the common data between the VMs. The method leverages a concept of peer ranking to select peer VMs to which the requesting VM performs queries. The peer ranking is based on the ranking value which represents a degree of similarity between the requesting VM and each VM of the ordered list of VMs. In fact, two VMs being similar will very likely show a common behavior, and thus accessing the same set of shared data. That is, a VM associated with a high ranking value has a high probability of holding data requested by the requesting VM.

Figure 3:
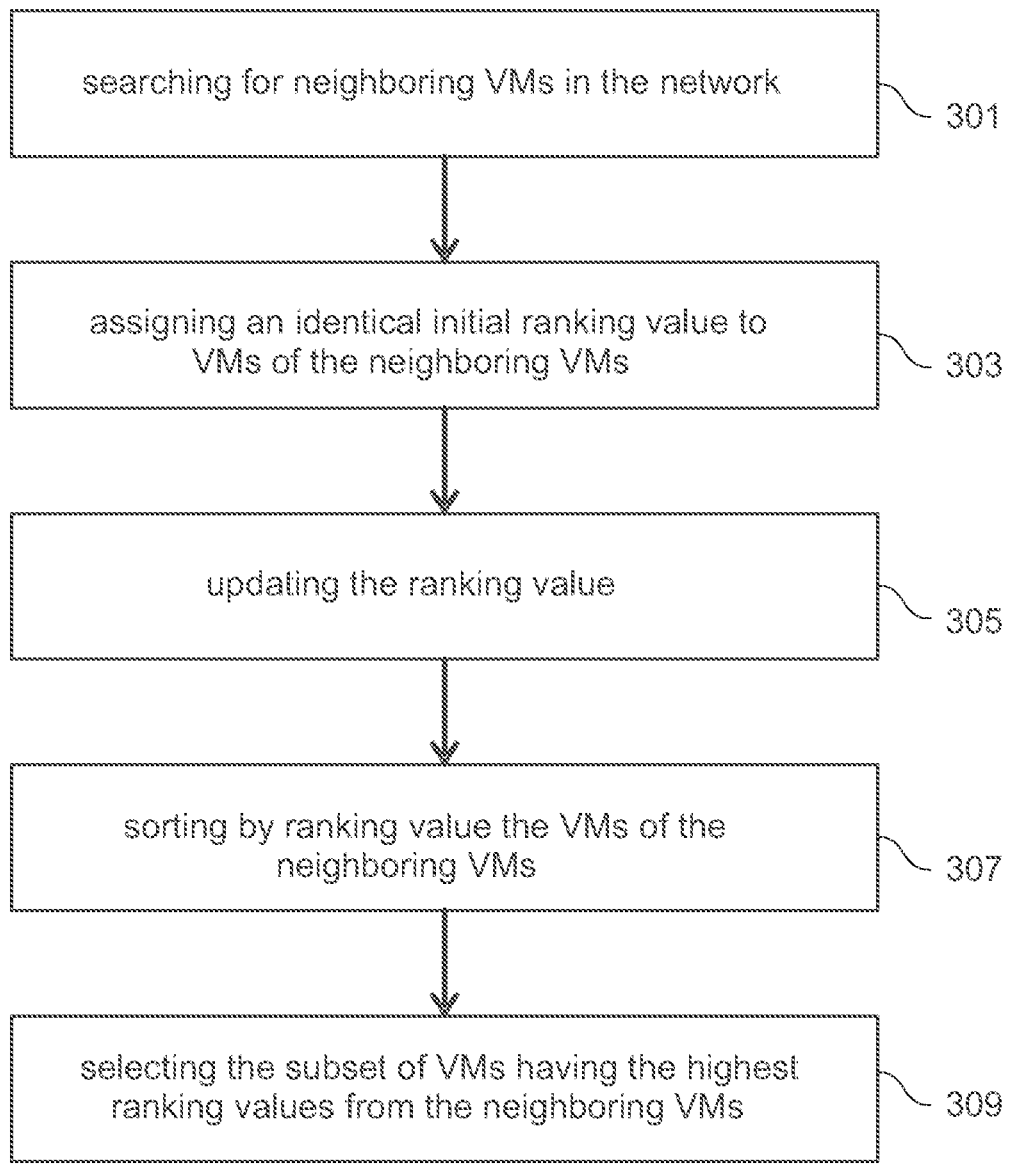
FIG. 3 is a flowchart of a method for selecting the subnet of VMs.

FIG. 3 is a flowchart of a method for selecting the subnet of VMs 106. In step 301, the requesting VM 106.1 searches for neighboring VMs 106 in the network 116. This is done, for example, by broadcasting a VM election request to the VMs of the same hypervisor 108, 110 and 112 or to the VMs 106 of the same subnet 120. This is followed by a reception of an identity, such as an iSCSI name, of each of the neighboring VMs. The iSCSI name is a worldwide unique name for identifying the VM. A VM may use the network to broadcast a request for the data from one or more VMs on a same machine as well as VMs on other machines of the computing environment. This increases the search efficiency and thus the probability to find the requested data. Another example of a VM identity is the IP address. Because the VMs on the same hypervisor usually have very high bandwidth, they can share data very quickly and efficiently. Further, VMs of the same subnet have the same network ID, and don't require any routing procedure in order to exchange data between them. This decreases the average access time to data, in contrast to the VMs belonging to different subnets.

In step 303, the requesting VM 106.1 assigns an identical ranking value to VMs of the neighboring VMs. Based on the frequency with which each VM 106 of the neighboring VMs satisfies data requests originating from the requesting VM 106.1, the requesting VM 106.1 updates, in step 305, the ranking value. In step 307, the requesting VM sorts by ranking value the VMs of the neighboring VMs. In step 309, the requesting VM selects the subset of VMs having the highest ranking values from the neighboring VMs. The subset of VMs 106 may further comprise the at least one storage server 118. The at least one storage server 118 is assigned a lowest ranking value.

Thus, the ranking value is proportional to the number of satisfied requests by a neighboring VM of the requesting VM. This provides a good estimate of the availability of future requested data by the requesting VM. This is because the higher the number of satisfied requests by a VM the more likely the VM is to have the future requested data. Thus, a high ranking value of the VM means that the VM is executing a similar workload as the requesting VM and it is likely that in the future it will be able to provide again required data by the requesting VM.

Figure 4:
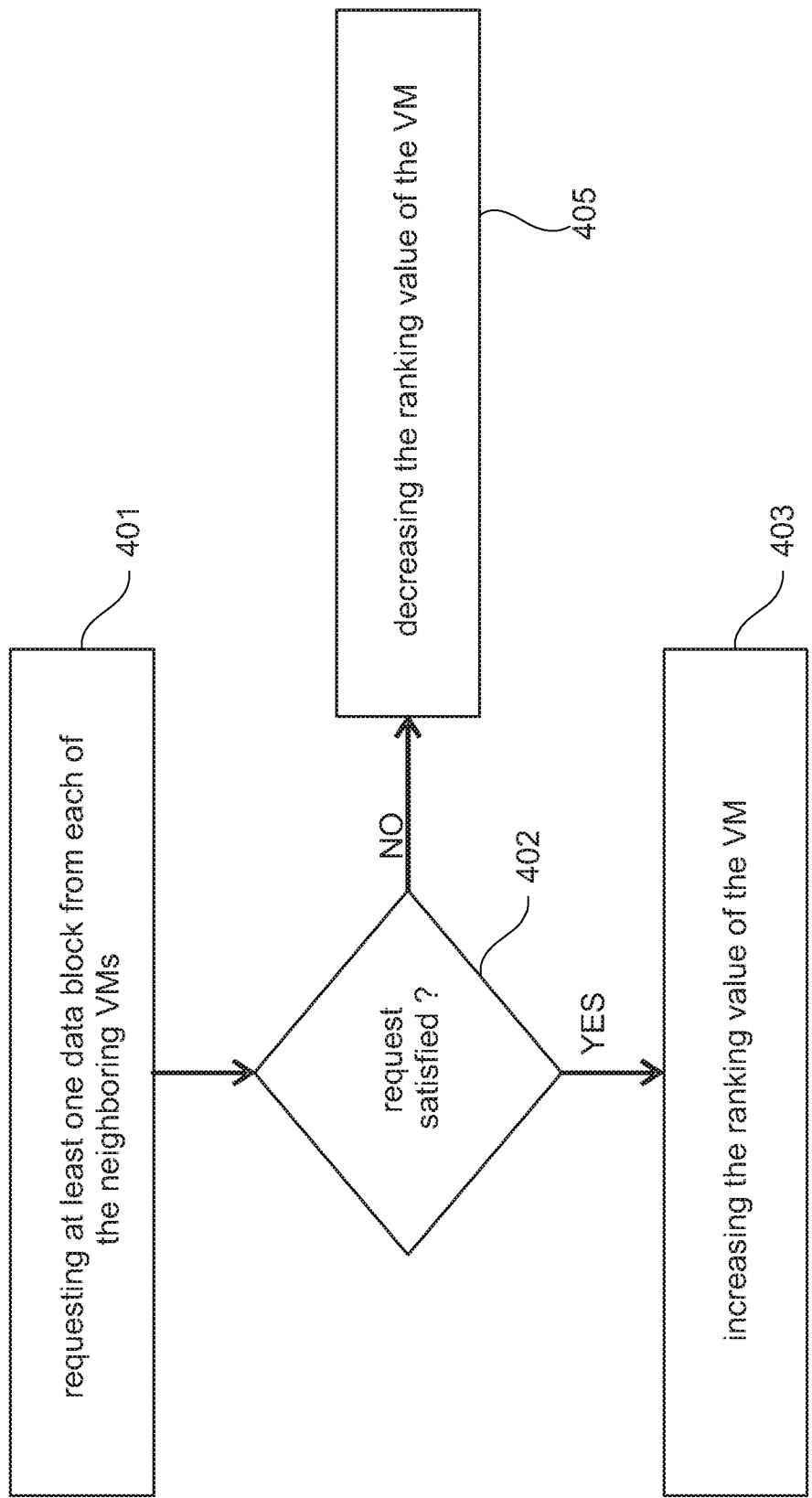
FIG. 4 is a flowchart of a method for updating the ranking value.

FIG. 4 is a flowchart of a method for updating the ranking value. In step 401, the requesting VM requests at least one data block from each VM of a group of VMs. If at step 402 the request is satisfied by a VM of the group of VMs, the requesting VM increases, in step 403, the ranking value of the VM. If at step 402 the request is not satisfied by the VM, the requesting VM decreases, in step 405, the ranking value of the VM.

Figure 5:
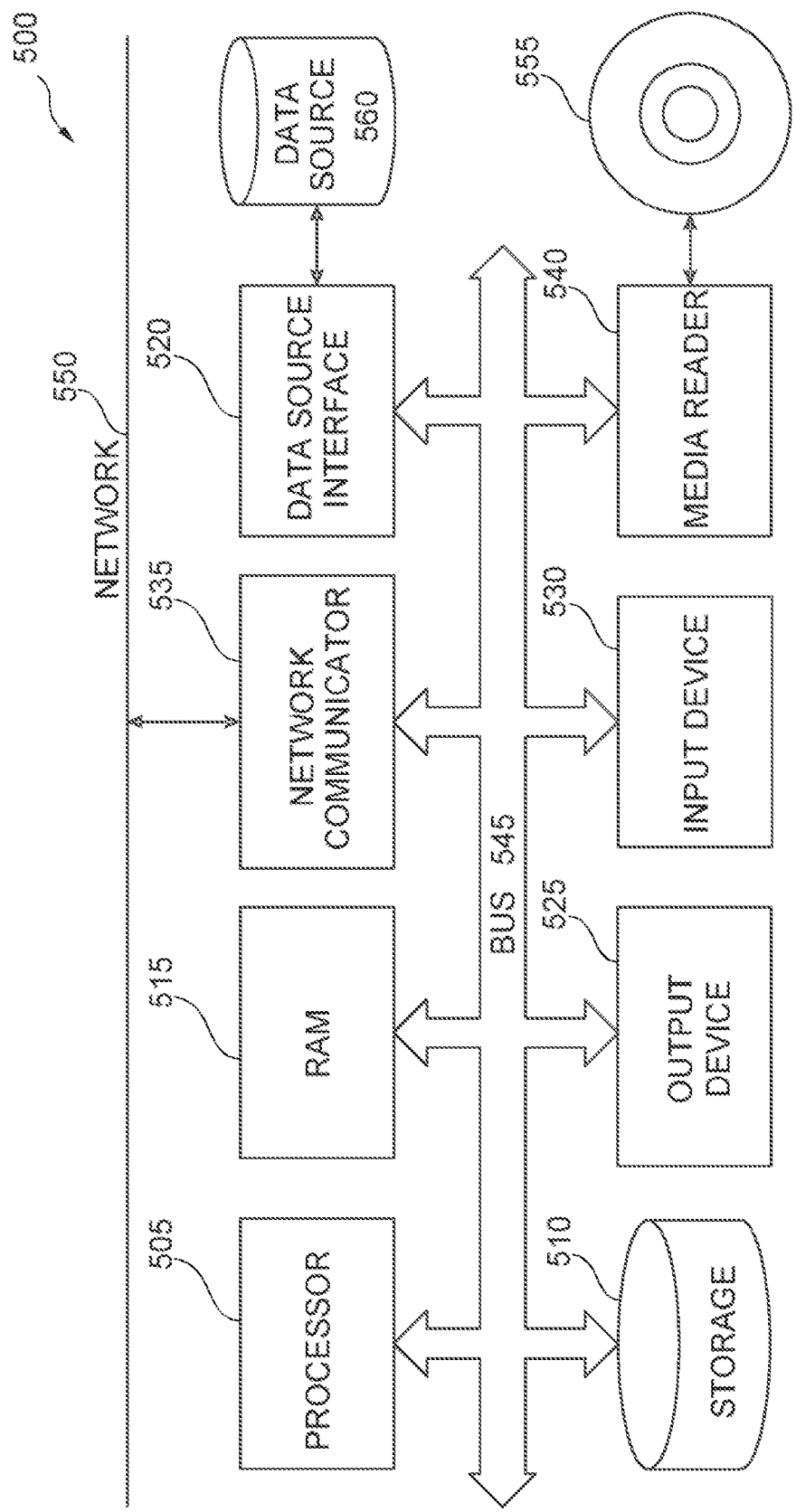
FIG. 5 is a block diagram illustrating an exemplary computer system.

FIG. 5 is a block diagram of an exemplary computer system 500. The computer system 500 includes a processor 505 that executes software instructions or code stored on a computer readable storage medium 555 to perform the above-illustrated methods of the invention. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. The stored instructions may be further compiled to generate other representations of the instructions and dynamically stored in the RAM 515. The processor 505 reads instructions from the RAM 515 and performs actions as instructed. The computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550.

The term "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, punched tape, punch cards, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example data may be retrieved over a modem, over the internet, or over a local area network. References to a computer-readable storage medium should be interpreted as possibly comprising multiple computer-readable storage mediums. Various executable components of a program or programs may be stored in different locations. The computer-readable storage medium may for instance comprise multiple computer-readable storage medium within the same computer system. The computer-readable storage medium may also be computer-readable storage medium distributed amongst multiple computer systems or computing devices.

The term "Computer memory" or "memory" is an example of a computer-readable storage medium. Computer memory is any memory which is accessible by a processor. Examples of computer memory include, but are not limited to: RAM memory, registers, and register files. In some instances a computer memory may also include: a hard disk drive, a floppy drive or a solid state hard drive. For instance, part of a memory may in fact be swap space on a hard drive. References to "computer memory" or "memory" should be interpreted as possibly comprise multiple memories. The memory may for instance comprise multiple memories within the same computer system. The memory may also comprise multiple memories distributed amongst multiple computer systems or computing devices.

The term "processor" as used herein encompasses an electronic component which is able to execute a program or machine executable instruction. References to the computing device comprising "a processor" should be interpreted as possibly containing more than one processor or processing core. The processor may for instance be a multi-core processor. A processor may also refer to a collection of processors within a single computer system or distributed amongst multiple computer systems.

The term "virtual machine" as used herein refers to software implementation of a computer that executes programs like a physical computer.

The term "SCSI" as used herein refers to small computer system interface that defines an ANSI-standard electronic interface and command set for transferring data between devices coupled to internal and external computer busses. SCSI connects a wide range of devices comprising, disk drives, tape drives, CD-ROM drives, printers, scanners, and other computer hardware and can be used on servers, workstations, and other computing devices.

The term "iSCSI" as used herein refers to internet based SCSI, which uses a TCP/IP network to communicate the SCSI operations. The SCSI commands may be encapsulated in TCP/IP frames.

The term "hypervisor" or virtual machine monitor as used herein refers to the software layer providing virtualization and supports multiple virtual machines.

The invention claimed is:

1. A computer implemented method for data handling in a computing environment comprising a plurality of virtual machines (VMs) and at least one storage server operably coupled through a network to the plurality of VMs, wherein each VM of the plurality of VMs has a data cache for storing data that has been read from the at least one storage server or other data caches, wherein the data cache comprises data cache hit information providing an indication that the data is located in the data cache, wherein each VM of the plurality of VMs has a ranking component to hold ranking of an ordered list of a subset of VMs, and wherein each VM of the subset of VMs has an assigned ranking value, the method comprising at each VM of the plurality of VMs:

generating, by a requesting VM, a data access request to access data;

sequentially checking, by the requesting VM, VMs of the ordered list for a data cache hit corresponding to the data in the order given by the ranking;

responsive to at least one data cache hit of a checked VM being found, reading, by the requesting VM, the data from the checked VM and thereafter updating, by the requesting VM, the ranking value of the checked VM, thereby updating the ranking of the ordered list based on the ranking value;

responsive to no data cache hit being found, requesting, by the requesting VM, the data from the at least one storage server;

searching, by the requesting VM, for neighboring VMs in the network;

assigning, by the requesting VM, an identical initial ranking value to VMs of the neighboring VMs;

updating, by the requesting VM, the ranking value based on the frequency with which each VM of the neighboring VMs satisfies data requests originating from the requesting VM;

sorting, by the requesting VM, by ranking value the VMs of the neighboring VMs; and selecting, by the requesting VM, the subset of VMs having the highest ranking values from the neighboring VMs.

2. The method of claim 1, wherein the searching comprises:

broadcasting, by the requesting VM, a VM election request; and receiving, by the requesting VM, an identity of at least one VM located on the network in response to the VM election request.

3. The method of claim 1, wherein the neighboring VMs comprise VMs located in a same hypervisor host of the computing environment.

4. The method of claim 1, wherein the neighboring VMs comprise VMs located in a same subnet of the network.

5. The method of claim 1, wherein the updating comprises:

requesting, by the requesting VM, at least one data block from each of the neighboring VMs;

responsive to the request is satisfied by a VM of the neighboring VMs, increasing, by the requesting VM, the ranking value of the VM; and responsive to the request is not satisfied by the VM, decreasing, by the requesting VM, the ranking value of the VM.

6. The method of claim 1, wherein the subset of VMs further comprises the at least one storage server, wherein the at least one storage server is assigned a lowest ranking value.

7. The method of claim 1, wherein the subset of VMs comprises the neighboring VMs.

8. The method of claim 1, further comprising sequentially checking, by the requesting VM, VMs of the ordered list until the data cache hit is found.

9. The method of claim 1, further comprising sequentially checking, by the requesting VM, all VMs of the ordered list.

10. The method of claim 1, wherein the at least one storage server comprises a shared iSCSI storage operating according to an iSCSI protocol.

11. A computer program product comprising a computer-readable non-transitory storage medium having computer-readable instructions stored therein which, when executed by a processor, cause the processor to:

generate a data access request to access data from a requesting virtual machine (VM);

sequentially check a plurality of virtual machines (VMs) of an ordered list for a data cache hit corresponding to the data in an order given by a ranking;

responsive to at least one data cache hit of a checked VM being found, read the data from the checked VM and thereafter update a ranking value of the checked VM, thereby updating the ranking of the ordered list based on the ranking value;

responsive to no data cache hit being found, request the data from at least one storage server, wherein the plurality of VMs are in a computing environment that further comprises the at least one storage server that is operably coupled through a network to the plurality of VMs, wherein each VM of the plurality of VMs has a data cache for storing data that has been read from the at least one storage server or other data caches, wherein the data cache comprises data cache hit information providing an indication that the data is located in the data cache, wherein each VM of the plurality of VMs has a ranking component to hold ranking of an ordered list of a subset of VMs, and wherein each VM of the subset of VMs has an assigned ranking value;

search for neighboring VMs in the network;

assign an identical initial ranking value to VMs of the neighboring VMs;

update the ranking value based on the frequency with which each VM of the neighboring VMs satisfies data requests originating from the requesting VM;

sort by ranking value the VMs of the neighboring VMs; and select the subset of VMs having the highest ranking values from the neighboring VMs.

12. The computer program product of claim 11, wherein the computer-readable instructions to search further cause the processor to:

broadcast a VM election request; and receive an identity of at least one VM located on the network in response to the VM election request.

13. The computer program product of claim 11, wherein the computer-readable instructions to update further cause the processor to:

request at least one data block from each of the neighboring VMs;

responsive to the request is satisfied by a VM of the neighboring VMs, increase the ranking value of the VM; and responsive to the request is not satisfied by the VM, decrease the ranking value of the VM.

14. The computer program product of claim 11, wherein the computer-readable instructions further cause the processor to:

sequentially check VMs of the ordered list until the data cache hit is found.

15. The computer program product of claim 11, wherein the computer-readable instructions further cause the processor to:

sequentially check all VMs of the ordered list.

16. A virtual machine for data handling in a computing environment comprising a plurality of virtual machines (VMs) and at least one storage server operably coupled through a network to the plurality of VMs, wherein each VM of the plurality of VMs has a data cache for storing data that has been read from the at least one storage server or other data caches, wherein the data cache comprises data cache hit information providing an indication that the data is located in the data cache, wherein each VM of the plurality of VMs has a ranking component to hold ranking of an ordered list of a subset of VMs, and wherein each VM of the subset of VMs has an assigned ranking value, the virtual machine being adapted for:

generating, by a requesting VM, a data access request to access data;

sequentially checking, by the requesting VM, VMs of the ordered list for a data cache hit corresponding to the data in the order given by the ranking;

responsive to at least one data cache hit of a checked VM being found, reading, by the requesting VM, the data from the checked VM and thereafter updating, by the requesting VM, the ranking value of the checked VM, thereby updating the ranking of the ordered list based on the ranking value;

responsive to no data cache hit being found, requesting, by the requesting VM, the data from the at least one storage server;

searching for neighboring VMs in the network;

assigning an identical initial ranking value to VMs of the neighboring VMs;

updating the ranking value based on the frequency with which each VM of the neighboring VMs satisfies data requests originating from the requesting VM;

sorting by ranking value the VMs of the neighboring VMs; and selecting the subset of VMs having the highest ranking values from the neighboring VMs.

17. The virtual machine of claim 16, wherein the virtual machine is further adapted for:
broadcasting a VM election request; and
receiving an identity of at least one VM located on the network in response to the VM election request.

18. The virtual machine of claim 16, wherein the virtual machine is further adapted for:
requesting at least one data block from each of the neighboring VMs;
responsive to the request is satisfied by a VM of the neighboring VMs, increasing the ranking value of the VM; and
responsive to the request is not satisfied by the VM, decreasing the ranking value of the VM.

19. The virtual machine of claim 16, wherein the virtual machine is further adapted for:
sequentially checking VMs of the ordered list until the data cache hit is found.

20. The virtual machine of claim 16, wherein the virtual machine is further adapted for:
sequentially checking all VMs of the ordered list.

* * * * *